United States Patent
Tolley et al.

(10) Patent No.: US 6,302,095 B1
(45) Date of Patent: Oct. 16, 2001

(54) BURN PREVENTION SCREEN FOR USE WITH AN OUTDOOR COOKING GRILL

(75) Inventors: Alan Tolley, Belmont, NC (US); Michael Hooper, Coronado, CA (US); Blake Leary, Charlotte, NC (US)

(73) Assignee: TIBS, Inc., Belmont, NC (US)

( * ) Notice: Subject to any disclaimer, the term of this patent is extended or adjusted under 35 U.S.C. 154(b) by 0 days.

(21) Appl. No.: 09/537,340

(22) Filed: Mar. 29, 2000

(51) Int. Cl.$^7$ ................................................... F24C 15/36
(52) U.S. Cl. ............................ 126/25 R; 126/42; 126/201
(58) Field of Search ........................... 126/25 R, 41 R, 126/201, 42; 16/435

(56) References Cited

U.S. PATENT DOCUMENTS

| | | | |
|---|---|---|---|
| 2,645,776 | * | 7/1953 | Kiler ........................................ 16/435 |
| 5,117,807 | * | 6/1992 | Graulich .................................. 126/42 |
| 5,590,640 | * | 1/1997 | Kollias et al. ....................... 126/25 R |

FOREIGN PATENT DOCUMENTS

298858-A1 * 1/1989 (EP) ....................................... 126/42

* cited by examiner

*Primary Examiner*—Sara Clarke
(74) *Attorney, Agent, or Firm*—Streets & Steele; Jeffrey L. Streets

(57) ABSTRACT

A burn prevention screen for use with an outdoor cooking grill. The burn prevention screen has a piece of high temperature tolerant material and a fastener for securing the high temperature tolerant material to the external surface of the grill. The high temperature tolerant material should be flexible, weather resistant, have a low thermal conductivity and be stable at temperatures in excess of 450° F. to 800° F. for extended periods of time. Examples of suitable material include felts, woven ceramic fiber, polymer sheet, composite fabric, other similar materials, or combinations of these materials. The fasteners are preferably magnets, with the preferred magnet being a rare earth magnet or other high temperature tolerant magnet that will retain its magnetic performance after repeated heating and cooling cycles.

11 Claims, 1 Drawing Sheet

BURN PREVENTION SCREEN FOR USE WITH AN OUTDOOR COOKING GRILL

FIELD OF THE INVENTION

The present invention relates to a method and apparatus for shielding the outer surface of a hot cooking grill against direct contact and burning of a person or object that unintentionally engages the grill.

BACKGROUND OF THE INVENTION

Many households use an outdoor charcoal or gas powered cooking grill. The grill is easily placed on and around the leisure areas of the yard, most commonly the deck or the patio area. The outdoor grill, while providing an alternative to cooking in the kitchen, presents a burn hazard for those persons working or playing in the vicinity of the grill, particularly children. The temperature of the grill surface is great enough to severely burn human skin in a matter of seconds.

Grill manufacturers have attempted to minimize exposed hot surfaces by adding handles, trays or working areas around the grill. These features have minimized the adult user's exposure to hot surfaces arising as a result of normal usage, however these features provide little protection to small children. The problem lies in the fact that a child's height is often below that of the handles or trays on a grill, leaving room for a child to accidentally, or at least unknowingly, come into contact with the hot surfaces of the grill.

Most grills have exterior surface temperatures that reach or exceed 450° F., and can reach temperatures as high as 700° F. Constructing an insulated surface for these grills is prohibitively expensive, would dramatically increase the cost to the consumer, and would most likely impact the performance of the grill.

Therefore, there is a need to reduce or eliminate accidental contact with the lower portion of a hot cooking grill. It would be desirable to have a screen or cover that was easy to install as an after-market screen. It would be further desirable if the design of the screen or cover was easily customizable to fit a significant number of commercial brands and types of grills.

SUMMARY OF THE INVENTION

The present invention provides a burn screen for use with an outdoor cooking grill, which typically has exposed surfaces that are subjected to temperatures ranging from 400–800° F. The burn screen consists of a piece of high temperature tolerant insulative material having a top edge and a bottom edge, and a fastener to secure the burn screen to the external grill surface. The fastener holds the insulative material in position adjacent to or around the external surfaces of the grill so that the material remains between the external surfaces and an object or person coming into contact with it. The fasteners should not interfere with the lid of the grill or prevent proper sealing of the lid to the body of the grill. The insulative material is preferably high-temperature tolerant and weather resistant.

A method for shielding small children from the external surfaces of an outdoor cooking grill is also provided. The method includes providing a piece of hightemperature tolerant insulative material of sufficient length to drape around and cover the external surfaces of the grill. The insulative material is positioned adjacent to the external surface of the grill and a fastener secures the material to the external surface.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
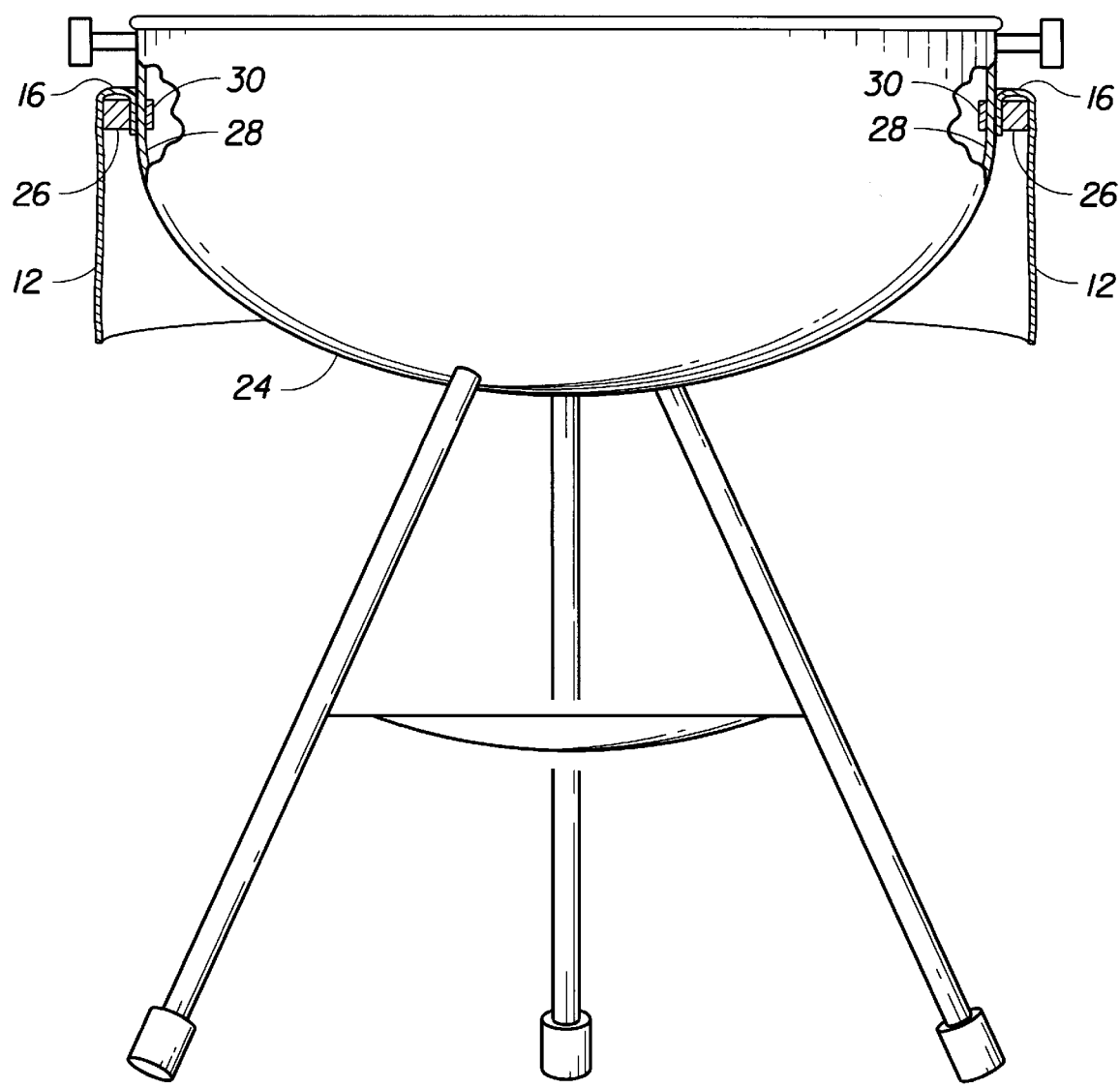
FIG. 1 is a cross sectional view of a grill having a grill screen secured to the side of the grill by magnets.

The present invention relates to a burn prevention screen, shield, or curtain for use with a conventional outdoor cooking grill. The screen provides protection against accidental or inadvertent contact with the hot outer surfaces of the cooking grill, especially as might occur from children running or playing near the grill.

The present invention includes a burn prevention screen having a flexible screen and a fastener capable of attaching an upper portion of the screen to the external surface of various types and brands of grills, including a WEBER (a trademark of Weber-Stephen Products Co.) type grill.

The high temperature tolerant material can be any suitable material that is flexible, weather resistant, has a low thermal conductivity and is stable at temperatures in excess of 450° F., and preferably in excess of 800° F. for extended periods of time. The material may be felt, woven ceramic fiber, polymer sheet, composite fabric, or similar materials, or combinations of these materials. A particularly preferred high temperature tolerant material useful in the present invention is Pre-ox Pan (available from Tex-Tech Industries, of Monmouth, Me.). The high temperature tolerant material preferably extends below the external surface of the grill.

The high temperature tolerant material is flexible for at least two reasons. First, the flexibility of the material allows it to normally hang downward away from the hot surfaces, yet the material does not require a rigid structure to support it. Rather, the flexibility of the material allows an approaching hand or object to press the material against the hot grill surface. Preferably, the material has sufficient flexibility to conform to the hand or object, or even to conform to the shape of the outer grill surface when contacted. Second, the flexibility of the material allows for a single screen to conform to any number of cooking grill sizes, types or brands without customization of the screen by the screen manufacturer. For example, the screen may be made having sufficient length to be secured around the perimeter of multiple sizes, types or brands of cooking grills, yet be sufficiently flexible to conform to any of the shapes or curvature of those grills. In addition, the fasteners or fastening method used to secure the screen to the grill is not dependent upon a particular size, shape, or other dimension of the grill. It is intended that the present invention provide a universal fit, meaning that the screen may be secured to a significant number of different commercial brands and types of grills. However, it may be preferred to cut the screen to length for use with a particular grill. After the screen is secured around the grill, the ends of the screen may be overlapped or secured together, such as clipping, inserting a brad, stapling or the like.

The preferred fastener system for securing the screen to the outer surface of the grill employs the use of magnets. Any magnetic material may be used in accordance with the invention, including those presently known and those to be developed in the future. There may also be any number of magnets used, but preferably between about 4 and about 15 magnets. The presently preferred magnet is a rare earth magnet or other high temperature tolerant magnet that will retain its magnetic performance after repeated heating and cooling cycles. These magnets are formulated to withstand high temperatures and maintain magnetic performance. The most preferred material is Samarium Cobalt (SmCo). A thin insulative barrier may be placed between the magnet and the grill surface to provide additional thermal insulation for the magnet. Furthermore, the magnets themselves may be covered by the insulative material to avoid the possibility of burns that may occur if the magnet is touched. For example, this may be achieved by securing the insulative material to the external surface of the grill with the magnets, allowing sufficient length along the top edge of the material to fold down and over the magnets, thus protecting against contact with the surface of the magnet.

The magnets may also be sewn into the insulative material, or attached by any other conventional permanent or temporary means, including pockets, adhesives, hooks, clips and the like. In this manner, the magnets can be provided with fixed spacing around the perimeter of the grill and at a fixed distance from the edges of the screen. While it is within the scope of the invention for the magnets to be positioned anywhere on the screen, including the center where the material drapes equally on either side of the magnets, it is preferred that the magnets are positioned adjacent a top edge.

If the grill walls are made of a material other than steel, it may be necessary or desirable to position one or more steel plates inside the grill wall opposite the magnets, so that the magnet will magnetically engage the steel plate through the grill wall with sufficient force to still secure the insulative material in place. Furthermore, the fastener system may employ the use of two magnets on opposing surfaces of the grill wall, although this is less preferred since the magnets on the internal surface of the grill will be directly exposed to extreme high temperatures.

As an alternative to magnets, the high temperature tolerant insulative material may be fastened to the external surface of the grill using a spring, a piece of string, or other like device that can be adjusted to accommodate the length and width, or diameter, of the grill. The spring, string, or other like fastener device will also obviously need to be made of a high temperature tolerant material. Other fasteners and methods of fastening the insulative material to the grill are deemed to be within the scope of the present invention.

FIG. 1 is a cross-sectional view of a grill 24 with a burn prevention screen 12 secured in position along the outer surface of the grill. The high temperature tolerant insulative screen 12 is held adjacent to the grill 24 by magnets 26 positioned around the perimeter of the grill against a side wall 28. If the side wall 28 is not made of steel, then an optional steel plate 30 may be positioned opposite the magnet 26 along the interior surface of the side wall 28. The magnet 26 will engage the steel plate 30 through the grill side wall 28, thus holding the burn prevention screen 12 securely in place. It should be noted that the steel plate 30 may be replaced by another magnet. The burn prevention screen 12 has a top edge 16, which has sufficient length to fold down over the magnet 26, thus protecting the external surface of the magnet. While the screen length may extend downward any length, the preferred length is about 12 inches.

Figure 2:
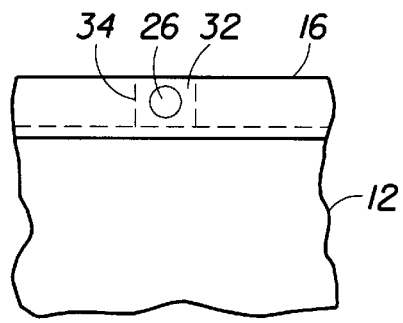
FIG. 2 is a partial side view of the grill screen having magnets sewn into pockets along the top edge.

FIG. 2 is a partial side view of the grill screen having magnets sewn into pockets along the top edge. The pocket 32 is preferably formed by folding the screen material over and sewing stitches 34 around the magnet. While the stiches may leave the pocket open for inserting or replacing the magnets, the magnet is shown as being secured in position. In this manner, one or more magnets will not be lost and will be maintained in a spaced relationship around the perimeter of the grill.

While the foregoing is directed to the preferred embodiment of the present invention, other and further embodiments of the invention may be devised without departing from the basic scope thereof, and the scope thereof is determined by the claims that follow.

We claim:

1. A burn prevention screen for preventing contact with an exterior surface of an outdoor cooking grill comprising:
   a. a flexible, high temperature tolerant skirt having a top edge; and
   b. a fastener coupled to the top edge of the skirt, the fastener being adapted to secure the high temperature tolerant material adjacent to the external surface of the cooking grill, wherein the high temperature tolerant material is pre-ox pan.

2. The burn prevention screen of claim 1, wherein the fastener comprises magnets.

3. The burn prevention screen of claim 2, wherein the skirt has pockets enclosing the magnets.

4. The burn prevention screen of claim 2, wherein the magnets are selected from high temperature tolerant materials.

5. The burn prevention screen of claim 2, wherein the fastener further comprises a steel plate positionable opposite the magnets.

6. The burn prevention screen of claim 2, wherein the fastener further comprises a steel plate positionable opposite the magnets, whereby the steel plate can be positioned on an interior non-metal grill wall to attract the magnets.

7. A burn prevention screen for preventing contact with an exterior surface of an outdoor cooking grill comprising:
   a. a flexible, high temperature tolerant skirt having a top edge;
   b. magnets coupled to the top edge of the skirt, the magnets being adapted to secure the high temperature tolerant material adjacent to the external surface of the cooking grill; and
   c. a steel plate positionable opposite the magnets.

8. The burn prevention screen of claim 7, wherein the high temperature tolerant material is felt, woven ceramic fiber, polymer sheet, composite fabric, or a combination thereof.

9. The burn prevention screen of claim 7, wherein the high temperature tolerant material is pre-ox pan.

10. The burn prevention screen of claim 7, wherein the skirt has pockets enclosing the magnets.

11. The burn prevention screen of claim 7, wherein the magnets are selected from high temperature tolerant materials.

* * * * *